Feb. 17, 1970   H. WITTNEBEN   3,495,644
ROLLER BODY, ESPECIALLY PNEUMATIC VEHICLE TIRE
Filed Oct. 5, 1966
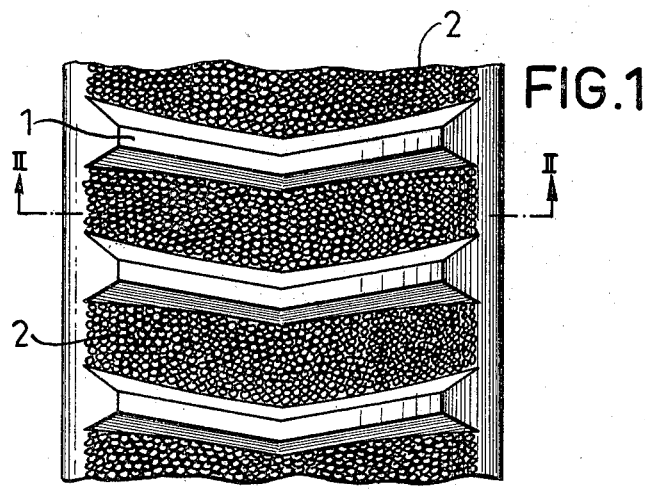
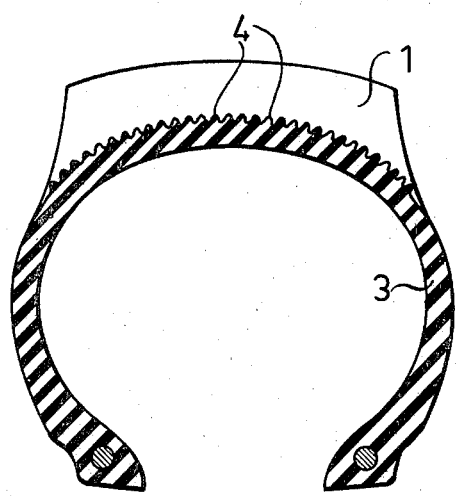
INVENTOR.
HERMANN WITTNEBEN United States Patent Office 3,495,644
Patented Feb. 17, 1970

3,495,644
ROLLER BODY, ESPECIALLY PNEUMATIC VEHICLE TIRE
Hermann Wittneben, Hannover, Germany, assignor to Continental Gummi-Werke Aktiengesellschaft, Hannover, Germany
Filed Oct. 5, 1966, Ser. No. 584,423
Claims priority, application Germany, Oct. 16, 1965, C 37,185
Int. Cl. B60c 11/08
U.S. Cl. 152—209      1 Claim

ABSTRACT OF THE DISCLOSURE

A body of rubber material, especially vehicle tire, which has a profiled surface with grooves therein for movement on a counter surface, the bottom surface of said grooves being uneven and provided with crevices.

---

The present invention relates to a roller body of rubber or rubber-like material, especially motor vehicle tire, and, more specifically, concerns a roller body of the above-mentioned type with a tread surface adapted to roll along a counter surface, and provided with grooves or similar profiles.

It is a well-known fact that such roller bodies at the bottom of the profiles frequently develop tears as a result of the repeated elastic deformations during the rolling action. Such tears which first appear in the form of hair-fine tears spread from the surface, widen out, and in the course of time extend below the profile. In more serious instances, they are the cause for the breaking off of parts of the profile portions.

Attempts have been made to counteract such formation of tears by selecting certain cross sectional shapes for the profile of the tread surface, by changing the composition of the mixture of the material, by special thermal post treatments of the finished roller body and by various other steps. However, all heretofore made attempts in this direction resulted only in minor improvements.

It has now been found, according to the present invention, that roller bodies of the above-mentioned type show a surprisingly low tendency to form tears in the profile of the tread surface, when the surface at the bottom of the grooves of the profile is uneven and provided with rough areas, for instance, in the form of knob-shaped or rib-shaped elevations and depressions or irregularly changing elevations and depressions. It would appear that the dissolution of the heretofore plane groove bottom in unevenness of the above-mentioned type impedes the formation of zones or local higher surface tensions so that the deformations inherent to the rolling action of the tire remain within the limits of elasticity and will even after frequently repeated cycle of movement not bring about tears due to fatigue. This effect is noticeable already with relatively small dimensions of the unevenness relative to the profile proper. As an optimum value for the height and depth of the unevenness of the surfaces, a dimension of from $\frac{1}{10}$ to $\frac{1}{20}$ of depth to the grooves has been found, whereas the extension of the unevenness in the direction of the width of the groove should preferably not exceed from $\frac{1}{5}$ to $\frac{1}{2}$ of the width of the groove.

The forming of the said unevenness of the groove surface causes no difficulties inasmuch as it can be obtained by a relatively minor change in the mold, which change has to be carried out only once.

The invention is illustrated by way of example in the accompanying drawing, in which:

FIG. 1 is a top view of a portion of a tire according to the invention.

FIG. 2 is a section along the line II—II of FIG. 1.

Referring now to the drawing in detail. The tire illustrated in the drawing has its tread surface provided with a relatively coarse profile in the form of angle-shaped ribs 1, which extend parallel to each other over the entire width of the tread surface and have the cross sectional shape of a flat V. Such tire is suitable in particular on cross country vehicles, agricultural tractors and the like. The ribs 1 confine between each other similarly shaped groove like depressions 2 the bottom of which corresponds to the outer mantle of the tire carcasses 3 in the range of the tread surface. Formed into the surface of the depressions 2 are knobs or wart-like elevations 4 so that the surface of the depressions has the appearance of a pattern. The structural design of the tire is irrelevant with regard to the inventive feature outlined above and, therefore, is not particularly illustrated in the drawing.

It is, of course, to be understood, that the present invention, is by no means, limited to the particular structure shown in the drawing, but also comprises any modification within the scope of the appended claim. Thus, while the present invention has been described as applied to profile tires for motor vehicles, pneumatic as well as solid tires, it is to be noted that the invention is by no means limited thereto. Thus, as a mere example, the invention can also be employed to soles for shoes and boots, and can also be used in connection with dynamically employed bodies of elastic material. It is also to be understood that the invention is by no means limited to the specific profile shown in the drawing, but can be applied to any other type of profiles.

What I claim is:

1. In an annular pneumatic tire for power vehicles which has a tread portion of substantialy uniform composition comprising a profiled running surface of transverse, flat, V-shaped ribs separated by wide, radially deepened grooves of substantially greater width than said ribs and including bottom surface unevenness, the improvement which comprises: wart-like or knob-like elevations forming the entire bottom surface unevenness approaching circular periphery of irregular bottom surface form, said wart-like or knob-shaped elevations forming a collective surface of the groove bottom and having random oriented distribution, so that curvilinear lines of juncture continuously divide said wart-like or knob-shaped elevations from even surfaces with respect to each other in all areas of the groove bottom, said lines extending in multidinous changes of direction to interrupt possible localized high surface tension and to obviate formation of hair-fine fatigue tears and surface cracks, said wart-like or knob-shaped elevations having a maximum height on the order of $\frac{1}{20}$ to $\frac{1}{10}$ of groove depth with a regional width such that the groove width is several times the width of said elevations in all directions between the transverse, flat, V-shaped ribs.

References Cited

UNITED STATES PATENTS

| | | | |
|---|---|---|---|
| 2,268,344 | 12/1941 | Shesterkin | 152—209 |
| 3,023,798 | 3/1962 | Moore et al. | 152—209 |
| 2,130,524 | 9/1938 | Clark | 152—209 |
| 2,626,649 | 1/1953 | Eiler | 152—209 |

FOREIGN PATENTS

| | | |
|---|---|---|
| 975,074 | 3/1951 | France |
| 1,202,712 | 1/1960 | France. |
| 1,323,857 | 3/1963 | France. |

ARTHUR L. LA POINT, Primary Examiner
C. B. LYON, Assistant Examiner